United States Patent [19]
Hatta

[11] Patent Number: 5,842,408
[45] Date of Patent: Dec. 1, 1998

[54] COFFEE BREWING PACKAGE UNIT

[75] Inventor: Misao Hatta, Tokyo, Japan

[73] Assignee: Kabushiki Kaisha Doutor Coffee, Tokyo, Japan

[21] Appl. No.: 838,229

[22] Filed: Apr. 17, 1997

[51] Int. Cl.⁶ .............................. A47J 31/06; B65D 33/14
[52] U.S. Cl. .............................. 99/323; 99/306; 426/82; 210/474
[58] Field of Search .............................. 99/323, 304, 306, 99/279; 426/77, 78, 79, 80, 81, 82, 83, 84, 112, 115; 210/474, 477, 478, 479, 497.2, 493.5

[56] References Cited

U.S. PATENT DOCUMENTS

| 4,584,107 | 4/1986 | Kataoka .................................. 210/474 |
| 4,715,271 | 12/1987 | Kitagawa ................................. 99/306 |
| 5,059,325 | 10/1991 | Iida ...................................... 426/82 X |
| 5,132,124 | 7/1992 | Tamaki et al. ............................ 426/82 |

FOREIGN PATENT DOCUMENTS

| 11763 | 3/1982 | Japan ....................................... 426/82 |
| 95528 | 6/1988 | Japan ....................................... 426/82 |
| 4-13568 | 2/1992 | Japan . |

Primary Examiner—Reginald L. Alexander
Attorney, Agent, or Firm—Jacobson, Price, Holman & Stern, PLLC

[57] ABSTRACT

A portable package unit used for extraction of coffee including a filter assembly easily attached to a receptacle such as a cup. The package unit includes a filter bag having a predetermined amount of parched coffee powder and a frame internally supporting the filter bag. The frame is made up of a pair of support boards each of which includes a pair of frame sections demarcated by a center fold line and a pair of wing sections connected to associated frame sections via bonding zones. The two support boards are united together along the bonding zones. When folded in a flat state for envelopment in the wrapper, the filter bag is wholly coved by the frame and the wing sections are superposed on the frame sections of the support boards. When unfolded cubically for attachment to the receptacle, the frame sections of the frame separate from each other to define a rectangular solid space in which the filter bag is suspended with its upper end being open for pouring of hot water.

7 Claims, 8 Drawing Sheets

COFFEE BREWING PACKAGE UNIT

BACKGROUND OF THE INVENTION

The present invention relates to a coffee brewing package unit, and more particularly relates to improvements in operability and compactness of a coffee brewing package unit which is filled with a weighed amount of parched coffee powder and adapted for separable attachment to a receptacle such as a cup to extract coffee thereinto when hot water is poured.

Recently, coffee brewing package units of the above-described type have been developed and used widely for service of coffee to a small number of persons because of their easy handling and handy transportation.

One example is proposed in Japanese Utility Model Opening Hei 4-13568 which was made open to the public in 1992. The package unit of this earlier proposal includes a filter paper bag which accommodates coffee powder and is bonded at its upper edge to the inside of a supporting frame made of a thick paper. A mouth of the supporting frame is opened by extending the supporting frame. Both ends of the supporting frame are extended beyond both ends of the filter paper bag to form arms. To attach the package unit to a receptacle such as a cup, the arms are put into engagement with the upper edge of the receptacle and the filter paper bag is located at the upper opening of the receptacle. When hot water is poured into the filter paper bag, coffee is extracted into the receptacle.

As stated above, the package unit of this prior art is attached to the receptacle via the plate-shaped arms. Use of such arms for attachment tends to position the package unit very unstably on the receptacle and accidental application of small shocks is liable to cause falling of the package unit. It is also difficult to keep the extended state of the supporting frame and, as a consequence, no smooth extraction of coffee can be continued. When folded flat, the arms of the supporting frame extend greatly beyond both ends of the filter paper bag. This configuration is quite unsuited for common envelopment of the supporting frame and the filter paper bag with a wrapper. A considerably large wrapper is needed for envelopment of a relatively small filter paper bag. This causes to increased wrapping cost.

Another example of the above-described type coffee brewing package unit is proposed in U.S. Pat. No. 4,584,101. The coffee brewing package of this earlier proposal has a filter assembly double folded and enveloped in an air-tight wrapper. The filter assembly includes a generally rectangular support plate made up of an intermediate portion with an opening for pouring hot water therethrough and a pair of support legs connected to opposite sides of the intermediate portion. The support legs are formed with coactive nipping members adjacent to their edges such that, when the support legs are folded upright relative to the intermediate portion, the nipping members are firmly engageable with the upper edge of a receptacle to support the whole assembly in a raised position for use. A filter paper bag open at one end is filled with a weighed amount of coffee powder and bonded to the rear side of the support plate to cover the opening in the support plate.

When extracting coffee using this package unit, the support plate is warped to raise the opening of the filter paper bag and the support legs of the support plate are put into engagement with the upper edge of the receptacle to attach the package unit to the receptacle. This operation for attachment is very cumbersome and a delicate technique. When enveloped in the wrapper, the support legs of the support plate extend greatly beyond both ends of the filter paper bag. So, just as the foregoing prior art, a considerably large wrapper is needed for envelopment of a relatively small filter paper bag and, as a consequence, an increase in wrapping cost results.

SUMMARY OF THE INVENTION

It is thus the primary object of the present invention to provide a coffee brewing package unit which can be easily set up for attachment to a receptacle such as a cup without need for any skilled technique of assembly.

It is another object of the present invention to provide a coffee brewing package unit which is very compact in design and suited for handy transportation and storage in a small space.

In accordance with the basic aspect of the present invention, a coffee brewing package unit is comprised of a filter assembly accommodating a weighed amount of parched coffee powder and a wrapper enveloping said filter assembly in a sealed condition.

The filter assembly includes a frame and a filter paper bag. The frame is foldable to a flat state and forms an opening for pouring hot water when unfolded cubically for attachment to a receptacle. The filter paper bag is supported in the opening of the frame and accommodates the weighed amount of parched coffee powder.

The frame is made up of a pair of support boards which are combined together in a manner such that the frame can be enveloped in the wrapper in a folded flat state. The support board is made of a substantially rectangular material which is deformable by hand.

Each support board is provided with a pair of opposite lateral side edges and a pair of opposite longitudinal side edges connecting the lateral side edges. A longitudinal center fold line is located at the lateral center between the longitudinal side edges and a pair of longitudinal side fold lines are located between the center fold line and the longitudinal side edges. A bonding zone runs along each side fold line to combine the support boards together. A frame section is located between the bonding zones including the center fold line and a pair of wing sections are located on opposite sides of the frame section via the bonding zones and each wing section includes a cutout for engagement with an opening edge of a receptacle.

The filter paper bag has a flat configuration in which a filter paper is folded flat along a center fold line and side edges are bonded together. The filter paper bag is open at an end opposite to the center fold line. The opening edges of the filter paper bag are attached to the lateral edges of the frame section of each support board in a manner such that, when the support boards are unfolded cubically for use, the opening edges form an opening for pouring hot water.

The frame is folded flat sandwiching the filter paper bag by bending along the center fold line. Further, the frame is extended for air-tight envelopment in the wrapper so that the pair of wing section are located substantially in a same flat plane in superposition with the frame section. At attachment of the filter assembly to a receptacle, the wing sections are separated from each other and the frame section extends to form the opening. Concurrently, the filter paper bag also develops an opening. Cubic unfolding of the filter assembly can be carried out very easily without a skilled technique. By adjusting the extent of the angle between the pair of wing sections, the cutouts can be fitted freely to receptacles of different sizes with complete stability.

When the filter assembly is folded, the wing sections are superposed on the frame section without any undesirable sideway projection so that the filter paper bag is almost wholly covered by the frame section. Thus, in the folded state, the filter assembly is almost the same in size as the filter paper bag. The filter paper bag is well protected by the frame section of the support board against possible external shocks.

DESCRIPTION OF THE PREFERRED EMBODIMENTS

One embodiment of the coffee brewing package unit in accordance with the present invention is shown in FIGS. 1 through 8, in which the coffee brewing package assembly is made up of a wrapper 1 and a filter assembly 2. The filter assembly 2 accommodates a weighed amount of parched coffee powder 3 which is heat sealed within the wrapper 1.

Figure 1:
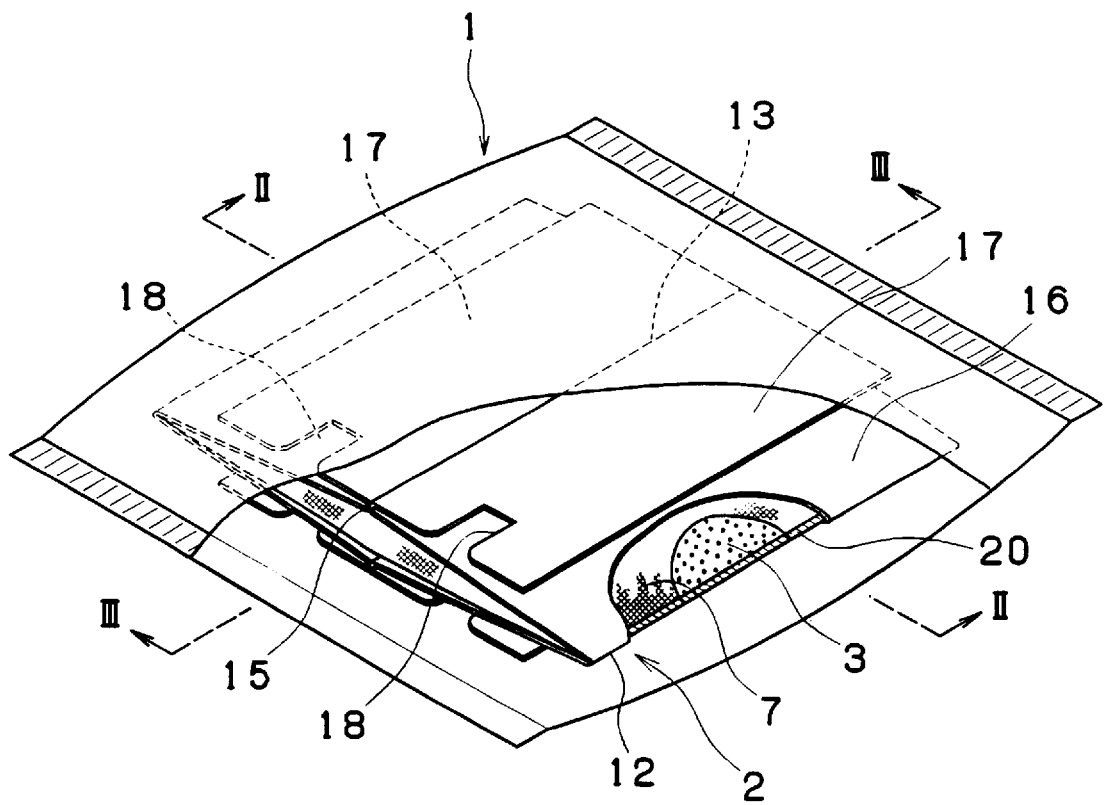
FIG. 1 is a perspective view, partly cut off for easier understanding, of one embodiment of the coffee brewing package unit in accordance with the present invention.
Figure 2:
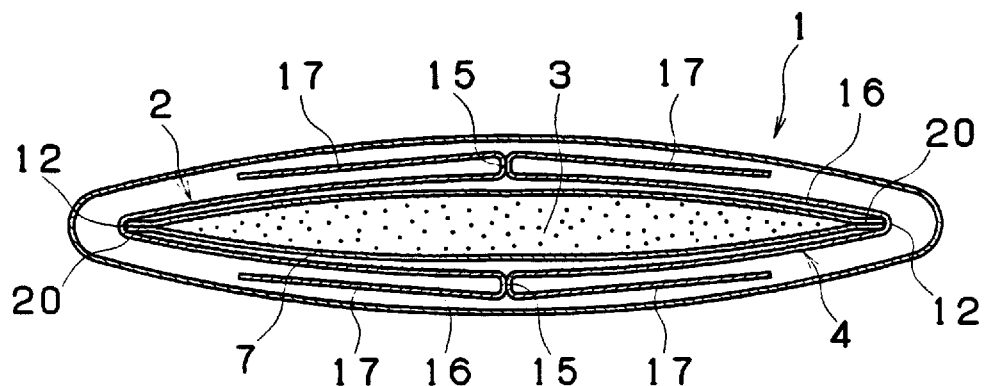
FIG. 2 is a cross section taken along a line II—II in FIG. 1.
Figure 3:
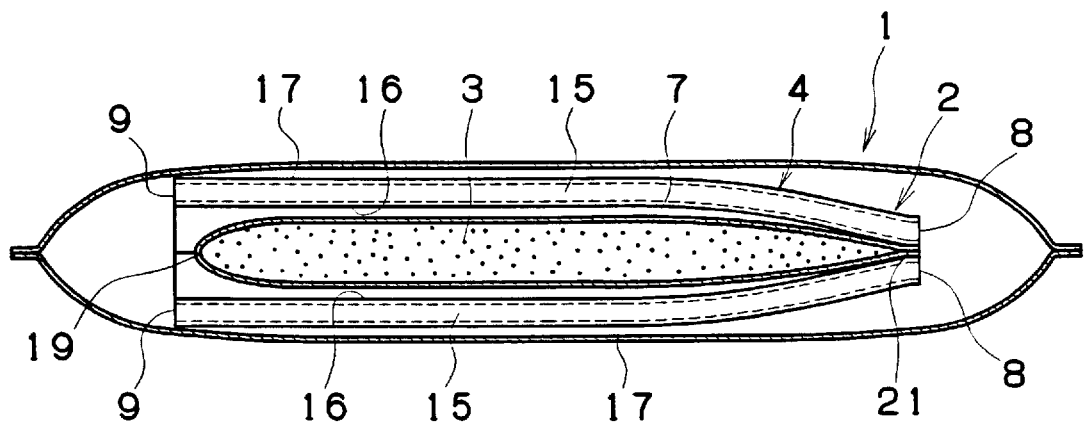
FIG. 3 is a section taken along a line III—III in FIG. 1.
Figure 4:
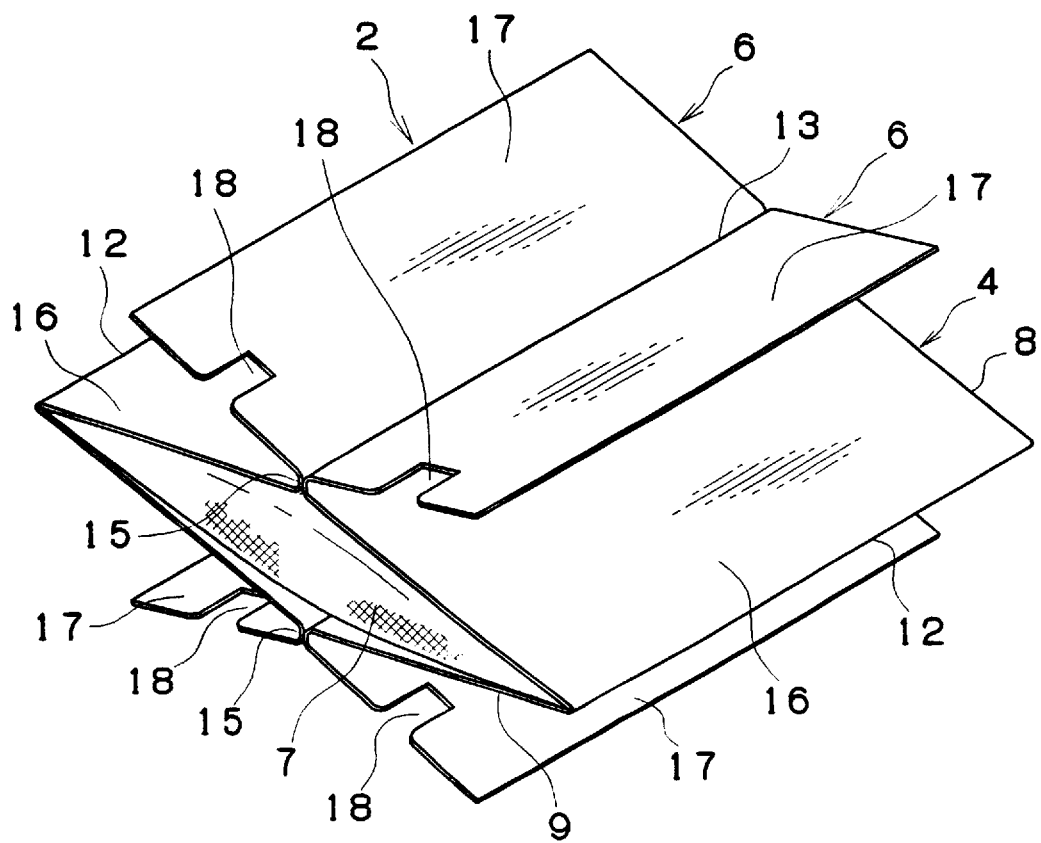
FIG. 4 is a perspective view of the coffee brewing package unit in a half-folded state.
Figure 5:
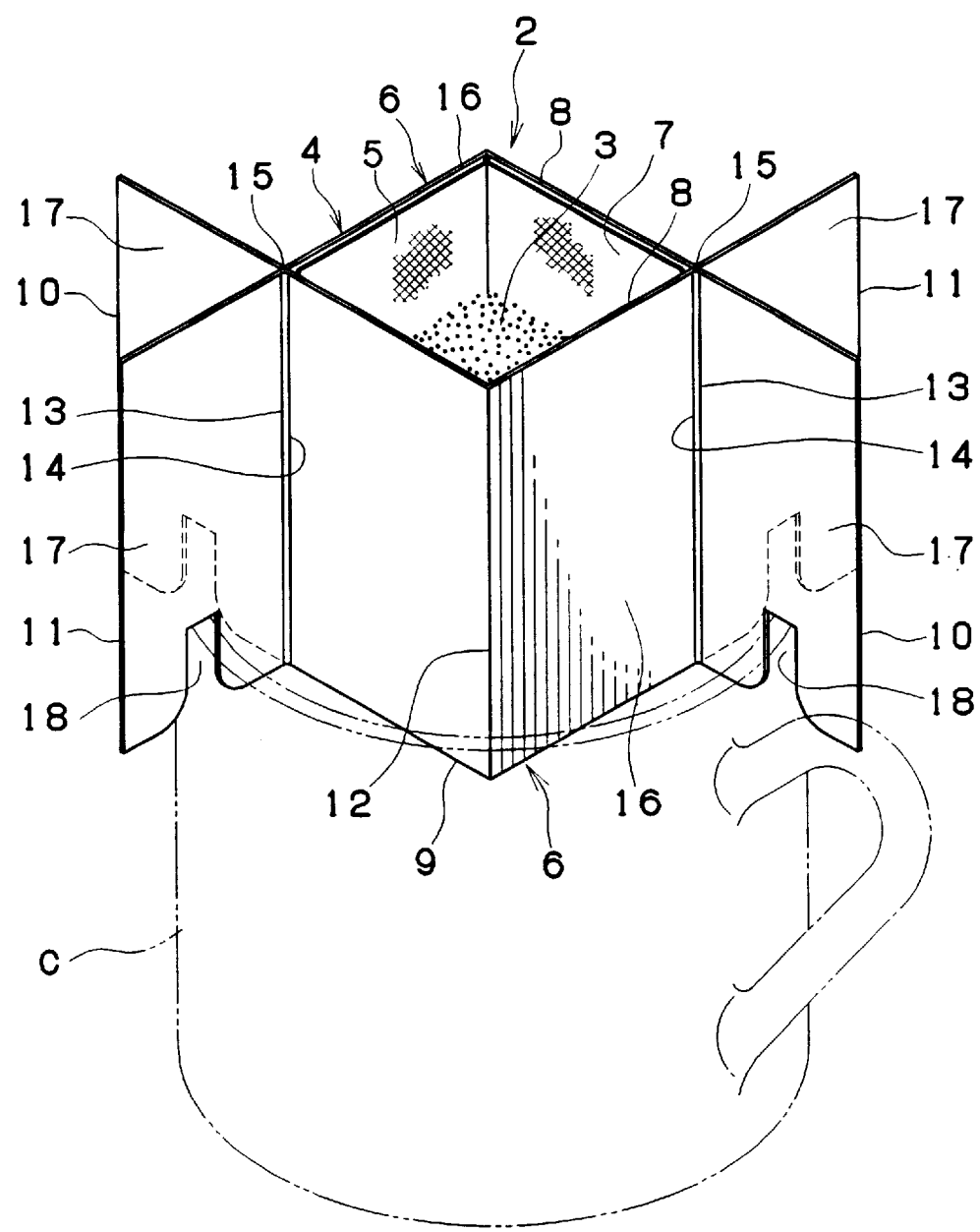
FIG. 5 is a perspective view of one embodiment of the coffee brewing package unit in accordance with the present invention in an unfolded state for use.
Figure 6:
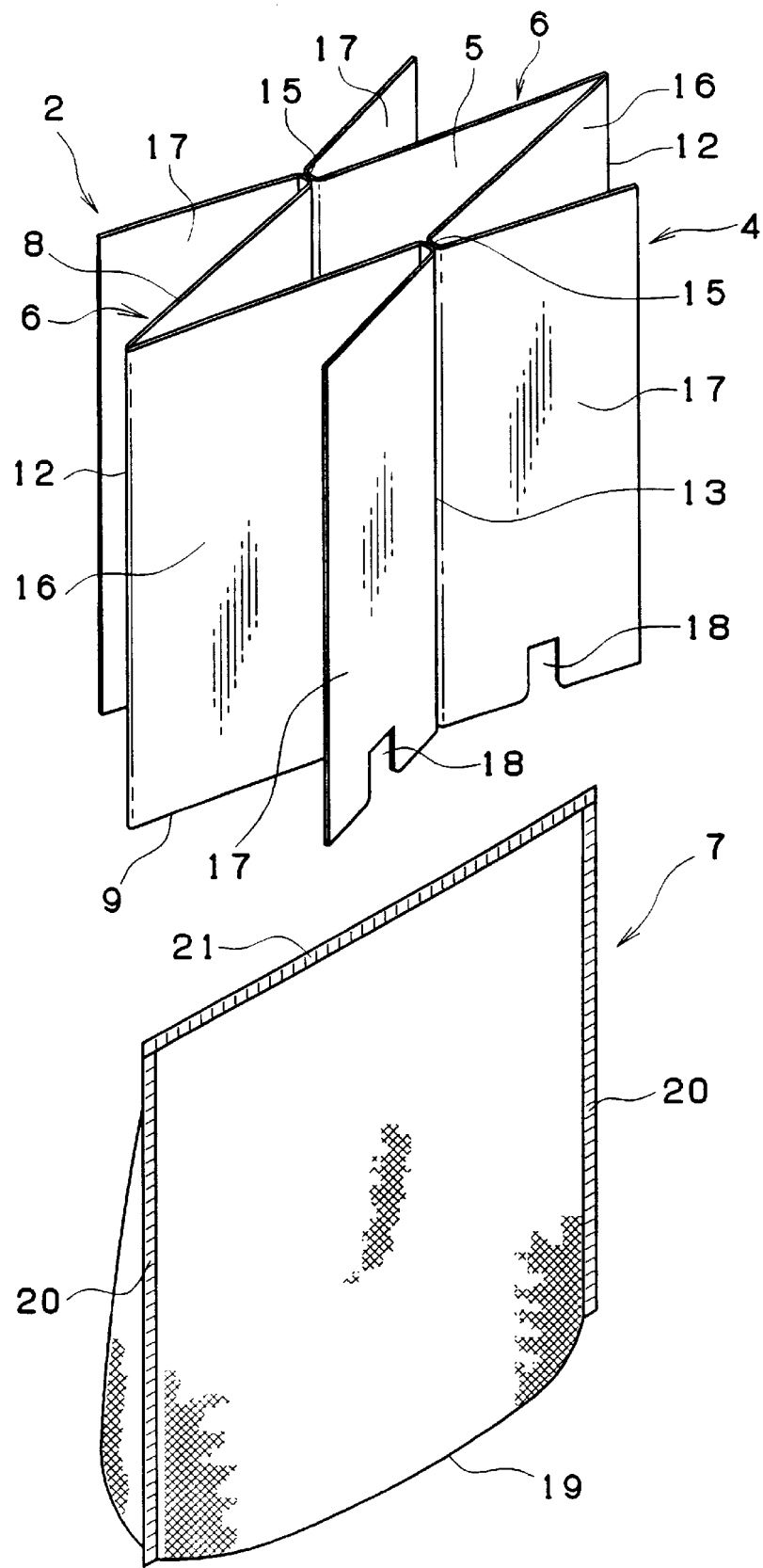
FIG. 6 is a perspective view of the filter assembly in a half-folded state and the filter paper bag separated from each other.
Figure 7:
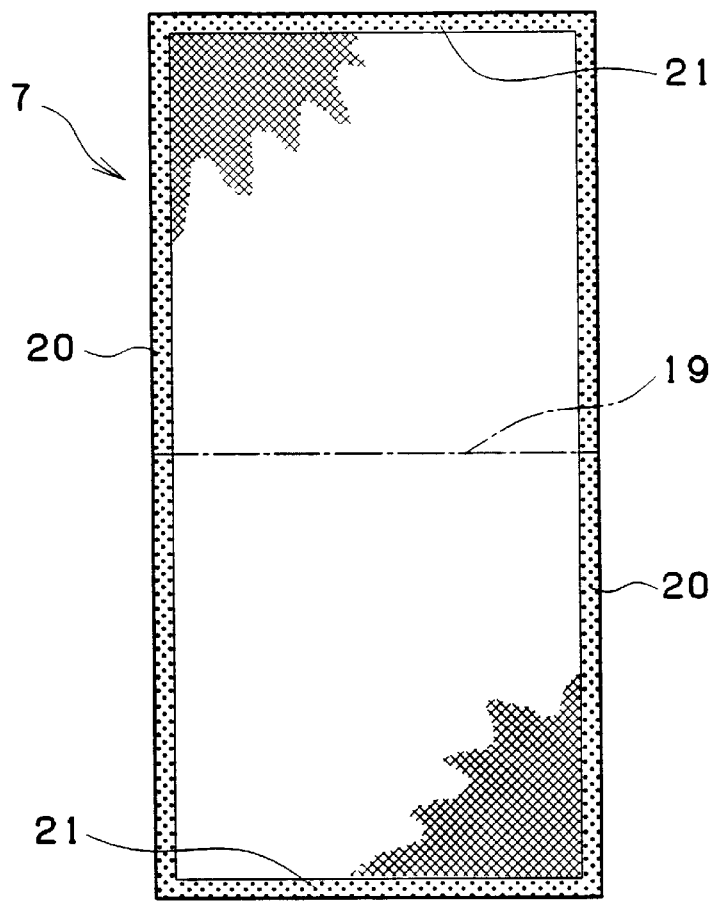
FIG. 7 is a top plan view of the filter paper bag in an extended state.
Figure 8:
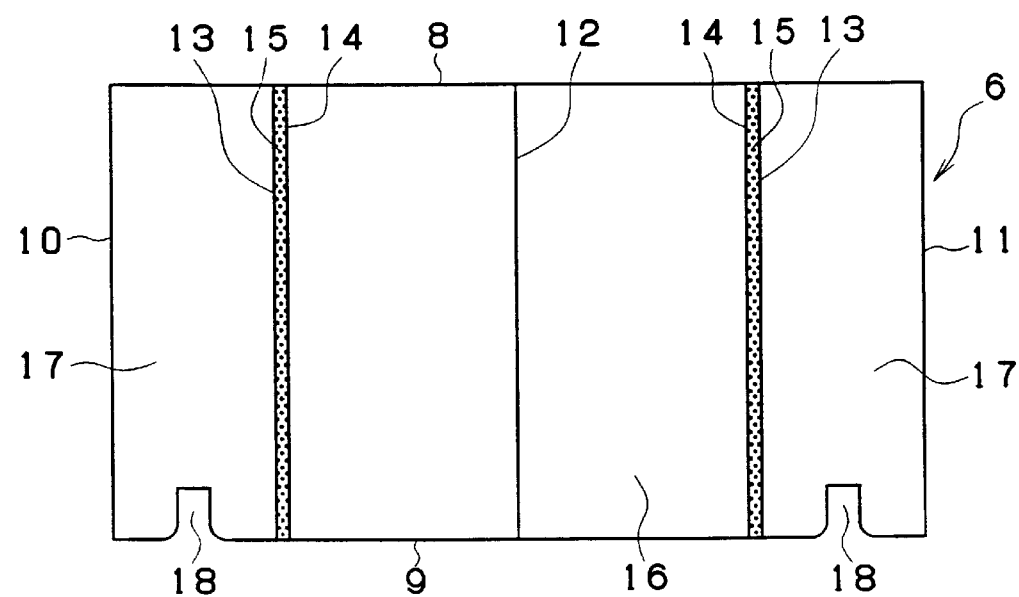
FIG. 8 is a top plan view of the support board in an extended state.

The construction of the filter assembly 2 is shown in detail in FIGS. 4 through 8. As illustrated, the filter assembly 2 has a frame 4 which can be folded flat and, for attachment to the upper edge of a receptacle C, unfolded cubically to form a rectangular opening 5. This frame 4 Is made up of a pair of support boards 6 combined together by bonding. As best seen in FIG. 8, each support board 6 is substantially rectangular in shape and formed by stamping a hard sheet material such as cardboard or a plastic sheet. As shown in FIG. 6, the filter paper bag 7 is made of, for example, a filter paper of synthetic fiber and supported between the pair of support boards 6 via bonding whilst accommodating the coffee powder 3.

As best seen in FIG. 8, the support board 6 is rectangular in configuration and deformable by hand. The support board 6 is defined by a pair of opposite lateral side edges 8, 9 and a pair of opposite longitudinal side edges 10, 11 connecting the lateral side edges 8, 9. The support board 6 has a longitudinal center fold line 12 at about its lateral center. A pair of longitudinal side fold lines 13 and 14 are located symmetrically on different sides of the center fold line 12. The support board 6 is folded in one direction along the center fold line 12 and in an opposite direction along the side fold lines 13 and 14. A bonding zone 15 is formed between the side fold lines 13 and 14.

A frame section 16 including the center fold line 12 is defined between the two side fold lines 14. A wing section 17 is defined between one longitudinal side edge 10 and one side fold line 13 whereas a like wing section 17 is defined between another longitudinal side edge 11 and another side fold line 13. In the area of the wing sections 17, cutouts 18 are formed in one lateral side edge 9 for engagement with a receptacle to which the entire package unit is attached. As shown in FIG. 6, two support boards 6 are combined together along the bonding zones 15 by ordinary bonding or heat sealing.

A typical construction of the filter paper bag 7 is shown in FIG. 7, in which the filter paper bag 7 in an extended state is substantially rectangular in shape and defined by a pair of opposite side edges 20 and a pair of opposite opening edges 21 connecting the side edges 20.

For use, the extended configuration is folded along a center fold line 19 and bonded along the side edges 20 to form a filter paper bag 7 having an opening defined by the opening edges 21. This opening is closed after the bag is filled with coffee powder 3 by application of ordinary bonding or heat sealing to the opening edges 21. Further, the outer surfaces of the opening edges 21 are bonded to the inner surfaces of the frame sections 16 of the support boards 6. The degree of adherence between the mating opening edges 21 is set lower than that of adherence between the opening edges 21 and the support board 6. As a consequence, bonding between the mating opening edges 21 is cancelled to form an opening therebetween when the support boards 6 are unfolded cubically. In the folded state, the filter paper bag 7 is almost wholly covered by the frame sections 16 of the support boards 6.

In use, the filter assembly 2 is unfolded cubically as shown in FIG. 5. By this unfolding of the filter assembly, the opening 5 is automatically formed at the upper end of the filter paper bag 7 and the package unit is now ready for pouring hot water. While keeping this state, the entire package unit is placed on the receptacle C with its lower cutouts 18 in engagement with the upper edge of the receptacle C.

Figure 9:
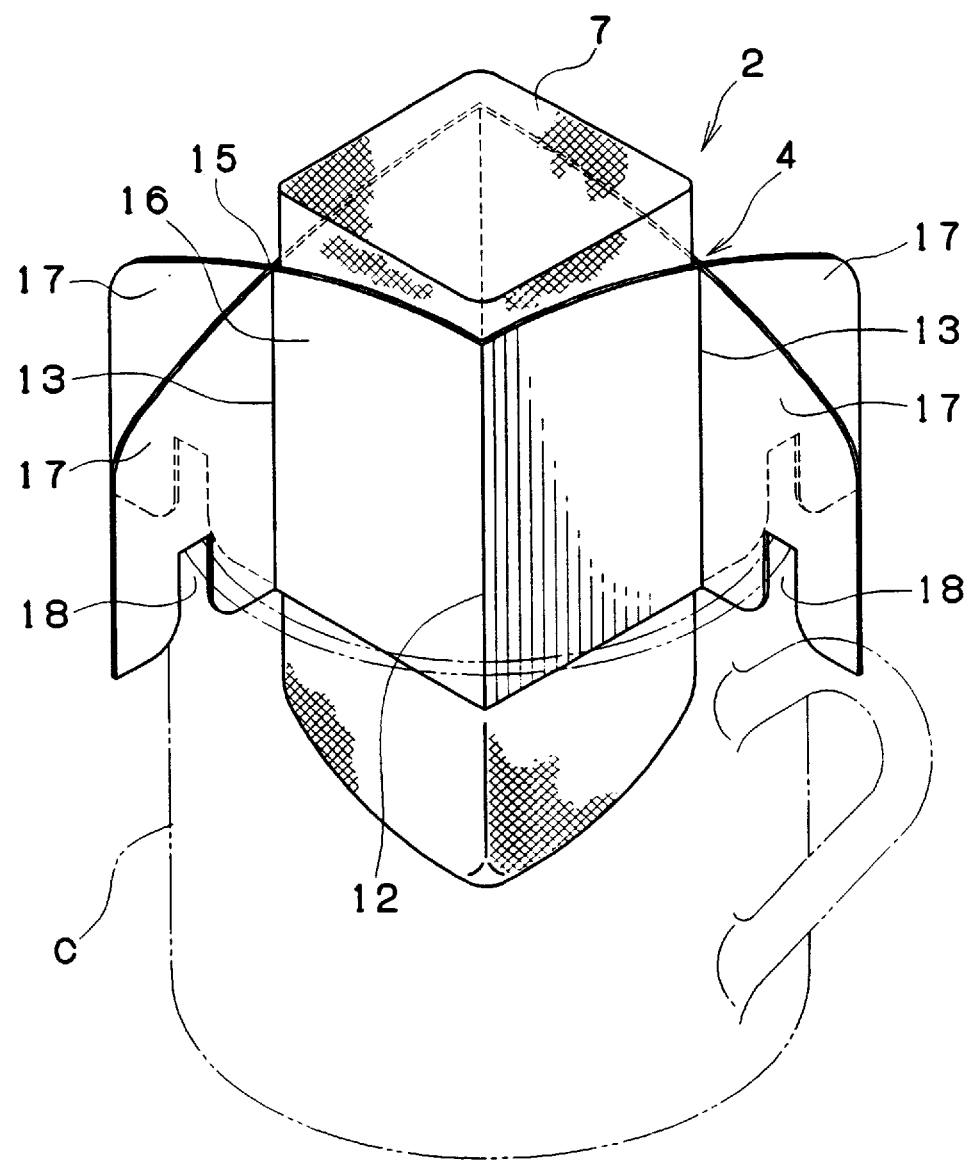
FIG. 9 is a perspective view of another embodiment of the coffee brewing package unit in accordance with the present invention in an unfolded state for use.
Figure 10:
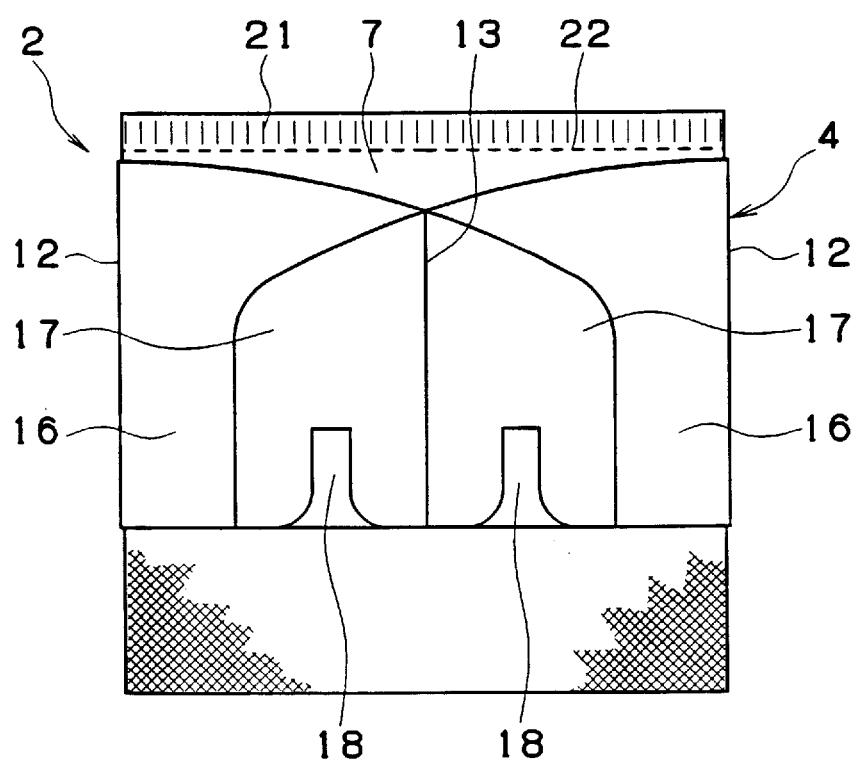
FIG. 10 is a top plan view of the coffee brewing package unit shown in FIG. 9 in a folded state.

Another embodiment of the coffee brewing package unit in accordance with the present invention is shown in FIGS. 9 and 10, in which elements substantially the same in function as those in the foregoing embodiment are indicated with the same reference numerals. In the case of this embodiment, the filter paper bag 7 is exposed on the upper and lower sides from the frame 4 of the filter assembly 2. Stated otherwise, half of the entire length of the side edge 20 of the filter paper bag 7 is larger than the entire length of the longitudinal side edge 10 or 11 of the support board 6 (see FIG. 6). Near the upper end section of the filter paper bag 7 exposed upwards from the filter assembly, discontinuous cut lines 22 are formed at a position just below the opening edge 21. An opening is formed by tearing the filter paper bag 7 along the cut lines 22.

The filter paper bag 7 filled with the parched coffee powder 3 is bonded to the inner surface of the frame 4 of the filter assembly 2. The pair of wing sections 17 are unfolded to be placed on the associated frame section 16 of the frame 4 and the filter assembly 2 with the filter paper bag 7 enclosed air-tight in the wrapper 1. In order to keep the fresh state of the coffee powder, the interior of the wrapper 1 may be evacuated or filled with inert gas after evacuation. When superposed on the frame sections 16 of the frame 4, the wing sections 17 do not extend beyond the outer periphery of the frame sections 16.

Figure 11:
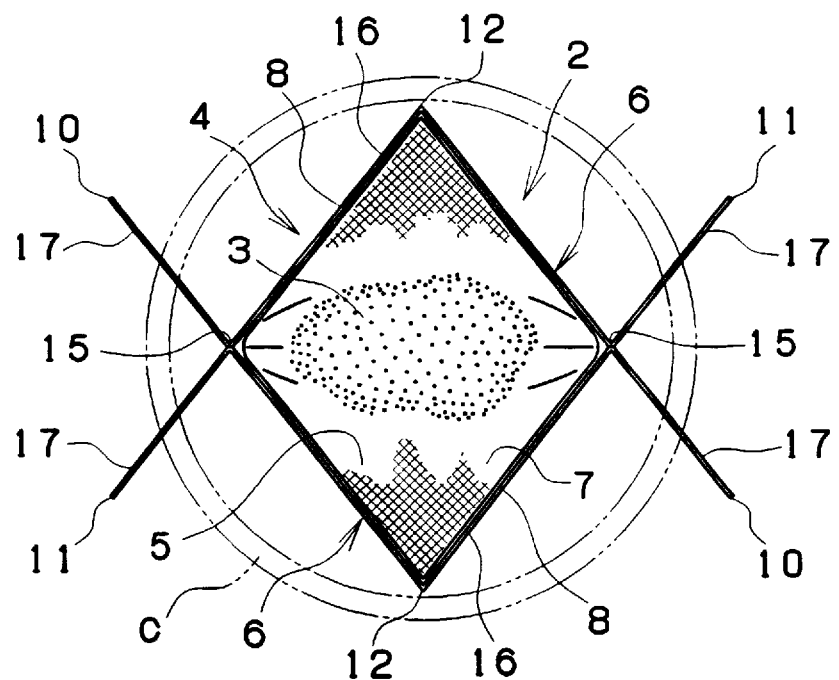
FIG. 11 is a top plan view of the coffee brewing package unit of the present invention attached to an ordinary size receptacle.
Figure 12:
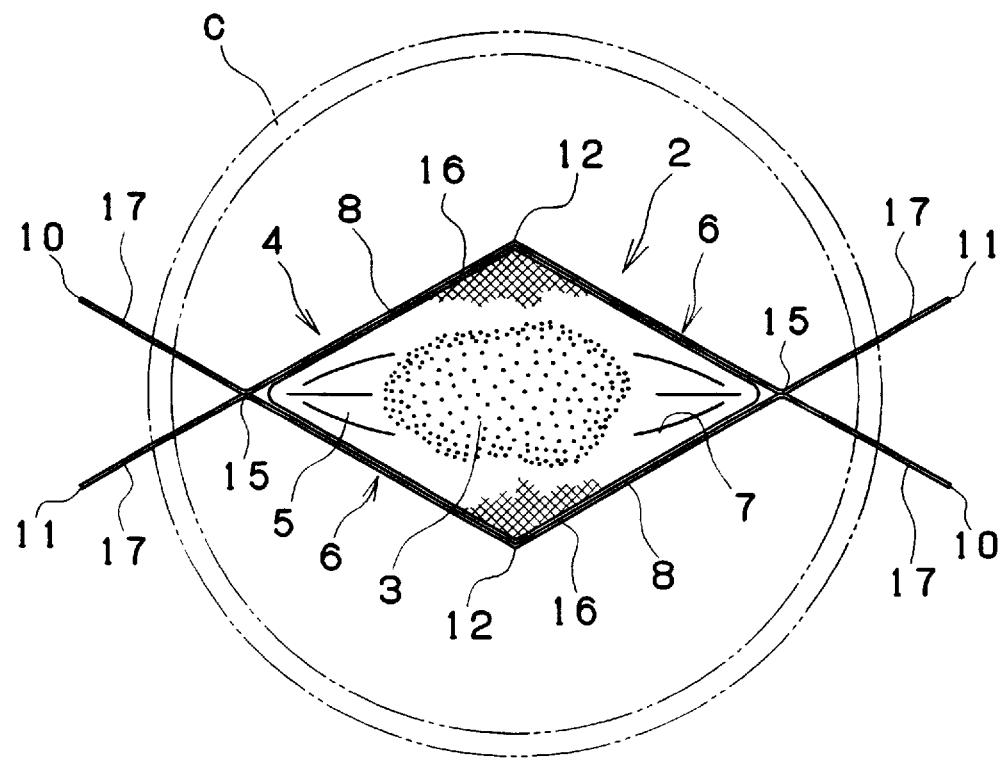
FIG. 12 is a top plan view of a like coffee brewing package unit attached to a large size receptacle.

For extraction of coffee using the package unit of this embodiment, the filter assembly 2 is taken out of the wrapper 1, the mating wing sections 17 are separated from each other by hand to set the frame 4 in a rectangular solid configuration. By this operation, the opening 5 is developed in the frame 4 and, concurrently, an opening is developed in the filter paper bag 7 via separation of the opening edges 21. By properly adjusting the degree of unfolding of the frame 4 at the center fold line 12 or the degree of separation of the wing sections 17, the cutouts 18 are registered at the upper edge of the receptacle for engagement. Through such adjustments, the package unit of the present invention can be attached to receptacles of various sizes as shown in FIGS. 11 and 12.

As is clear from the foregoing descriptions, cubic unfolding of the filter assembly can be carried out very simply and easily without requiring a skilled technique. By properly adjusting the degree of unfolding of the frame 4 at the center fold line 12 or the degree of separation of the wing sections, the package unit can be attached to receptacles of various sizes. Further, when folded, the filter assembly 2 is almost the same in size as the filter paper bag 7 and, as a consequence, assures compact wrapping by the wrapper. In addition, the filter paper bag 7 is well protected against external shocks because, in the wrapped state, the same is almost wholly covered by the frame 4 of the filter assembly 2.

I claim:

1. A coffee brewing package unit comprising a filter assembly accommodating a weighed amount of parched coffee powder, and a wrapper enveloping said filter assembly in an air-tight state, said filter assembly including a frame which is foldable in a flat state and forms an opening for pouring hot water when unfolded cubically for attachment to a receptacle, and a filter paper bag which is supported within said opening of said frame and accommodates said weighed amount of parched coffee powder, said frame being made up of a pair of combined, substantially rectangular and manually deformable support boards which are enveloped in said wrapper in a flatly folded state and unfolded cubically for use to form said opening, each said support board being provided with a pair of opposite lateral side edges, a pair of opposite longitudinal side edges connecting said lateral side edges, a longitudinal center fold line located at the lateral center between said longitudinal side edges, a pair of longitudinal side fold lines located between said center fold line and said respective longitudinal side edges, bonding zones each extending along each said side fold line to combine said support boards together, a frame section located between said bonding zones whilst including said center fold line, and a pair of wing sections located on opposite sides of said frame section via said bonding zones and each including a cutout for engagement with said receptacle, and said filter paper bag being sealed to accommodate said coffee powder and having a pair of opening edges attached to said lateral edges of said frame section of each said support board in such a manner that, said support boards are unfolded cubically for use, said opening edges separate from each other to form said opening for pouring hot water.

2. A coffee brewing package unit comprising a filter assembly accommodating a weighed amount of parched coffee powder, and a wrapper enveloping said filter assembly in an air-tight state, said filter assembly including a frame which is foldable in a flat state and forms an opening for pouring hot water when unfolded cubically for attachment to a receptacle, and a filter paper bag which is supported within said opening of said frame and accommodates said weighed amount of parched coffee powder, said frame being made up of a pair of combined, substantially rectangular and manually deformable support boards which are enveloped in said wrapper in a flatly folded state and unfolded cubically for use to form said opening, each said support board being provided with a pair of opposite lateral side edges, a pair of opposite longitudinal side edges connecting said lateral side edges, a longitudinal center fold line located at the lateral center between said longitudinal side edges, a pair of longitudinal side fold lines located between said center fold line and said respective longitudinal side edges, bonding zones each extending along each said side fold line to combine said support boards together, a frame section located between said bonding zones whilst including said center fold line, and a pair of wing sections located on opposite sides of said frame section via said bonding zones and each including a cutout for engagement with said receptacle, said filter paper bag being made up of a pair of superimposed sections formed by folding a rectangular sheet along its center fold line into a flat configuration, said superimposed sections being bonded together along their side edges whilst leaving an opening at one end thereof opposite to said center fold line, and edges of said opening being combined to inner surfaces of said frame of said support boards in such a manner that, when said frame is unfolded, said edges of said opening are separated from each other.

3. A package unit as claimed in claim 1 in which said frame is folded into a flat configuration by folding said frame sections along said center fold lines, and said filter assembly is enclosed air-tight in said wrapper with said wing sections extended in a substantially same plane in superposition with said frame sections.

4. A package unit as claimed in claim 1 in which said wing sections do not extend beyond an outer periphery of said frame sections when superposed on said frame sections.

5. A package unit as claimed in claim 1 in which said filter paper bag is enclosed air-tight in said wrapper whilst being almost wholly covered by said frame sections of said support boards.

6. A package unit as claimed in claim 1 in which said edges of said opening of said filter paper bag are heat sealed together, and said opening of said filter paper bag is open when said frame of said filter assembly is unfolded cubically.

7. A package unit as claimed in claim 1 in which one end section of said filter paper bag projects outside said lateral edges of said frame, and discontinuous cut lines are formed in said one end section so that an opening is formed in said filter paper bag when said one end section is torn along said cut lines.

* * * * *